United States Patent
Youn et al.

(10) Patent No.: US 10,582,379 B2
(45) Date of Patent: Mar. 3, 2020

(54) METHOD FOR SUPPORTING AND SETTING IPSEC IN MOBILE COMMUNICATION

(71) Applicant: LG Electronics Inc., Seoul (KR)

(72) Inventors: Myungjune Youn, Seoul (KR); Jinsook Ryu, Seoul (KR); Hyunsook Kim, Seoul (KR); Laeyoung Kim, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 15/244,120

(22) Filed: Aug. 23, 2016

(65) Prior Publication Data

US 2017/0064544 A1 Mar. 2, 2017

Related U.S. Application Data

(60) Provisional application No. 62/210,998, filed on Aug. 28, 2015.

(51) Int. Cl.
*H04W 12/02* (2009.01)
*H04L 29/06* (2006.01)
*H04W 8/12* (2009.01)
*H04W 84/04* (2009.01)

(52) U.S. Cl.
CPC ......... *H04W 12/02* (2013.01); *H04L 65/1006* (2013.01); *H04L 65/1016* (2013.01); *H04W 8/12* (2013.01); *H04W 84/042* (2013.01)

(58) Field of Classification Search
CPC ....... H04W 12/02; H04W 4/005; H04W 8/12; H04W 84/02; H04W 84/042; H04W 4/70; H04W 60/04; H04L 63/0428; H04L 65/1006; H04L 65/1016; H04L 63/306; H04L 63/164
See application file for complete search history.

(56) References Cited

U.S. PATENT DOCUMENTS

| | | | |
|---|---|---|---|
| 2008/0095070 A1* | 4/2008 | Chan | H04L 63/0272 370/254 |
| 2008/0141021 A1* | 6/2008 | Hsu | H04L 63/0428 713/153 |
| 2009/0216906 A1* | 8/2009 | Weniger | H04L 41/147 709/246 |
| 2009/0220091 A1* | 9/2009 | Howard | H04L 63/0428 380/277 |
| 2010/0263032 A1* | 10/2010 | Bhuyan | H04L 63/061 726/7 |
| 2011/0216743 A1* | 9/2011 | Bachmann | H04L 63/164 370/331 |
| 2011/0261787 A1* | 10/2011 | Bachmann | H04L 63/029 370/331 |
| 2011/0305339 A1* | 12/2011 | Norrman | H04W 12/003 380/270 |

(Continued)

*Primary Examiner* — Cheng-Feng Huang
(74) *Attorney, Agent, or Firm* — Dentons US LLP

(57) ABSTRACT

One disclosure of the present specification provides a method for supporting an internet protocol security (IPsec). The method may be performed by a mobility management entity (MME) and comprise: receiving a tracking area update (TAU) request message from a user equipment (UE); determining whether to activate an encryption option of IPsec; and transmitting a TAU accept message including IPsec related information generated based on the determination.

7 Claims, 13 Drawing Sheets

(56) References Cited

U.S. PATENT DOCUMENTS

2012/0252481 A1* 10/2012 Anpat .................. H04W 8/06
　　　　　　　　　　　　　　　　　　　　455/456.1
2013/0254531 A1* 9/2013 Liang .................. H04L 63/164
　　　　　　　　　　　　　　　　　　　　713/151

* cited by examiner

METHOD FOR SUPPORTING AND SETTING IPSEC IN MOBILE COMMUNICATION

CROSS-REFERENCE TO RELATED APPLICATION

This application claims the benefit of priority of U.S. Provisional Application No. 62/210,998 filed on Aug. 28, 2015, which is incorporated by reference in its entirety herein.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 shows a connection between an EPC and an IP Multimedia Subsystem (IMS).

Referring to FIG. 6, the EPC is illustrated to include an MME 51, an S-GW 52, a P-GW 53a connected to the IMS, a P-GW 53b connected to the Internet, a Policy and Charging Rule Function (PCRF) 58 connected to the P-GW 53b, and a Traffic Detection Function (TDF) 59 connected to the PCRF 58.

The TDF 59 is a functional entity that performs application detection and reporting of detected application and its service data flow description to the PCRF 58. The TDF supports solicited application reporting and/or unsolicited application reporting.

The IMS is a network technology which enables packet switching (PS) based on an Internet Protocol (IP) with respect to wireless terminals in addition to wired terminals, and has been proposed in order to connect both wired/wireless terminals through an IP (All-IP).

Such an IMS-based network includes a Call Session Control Function (CSCF) and an Interconnection Border Control Functions (IBCF) 62 for processing procedures for control signaling, registration, and a session. The CSCF includes a Proxy-CSCF (P-CSCF) 61 and a Serving-CSCF (S-CSCF) 63. Furthermore, the CSCF may include an Interrogating-CSCF (I-CSCF). The P-CSCF 61 operates as a first access point for User Equipment (UE) within the IMS-based network. Furthermore, the S-CSCF 63 processes a session within the IMS-based network. That is, the S-SCSF 63 is an entity responsible for routing signaling, and routes a session within the IMS-based network. Furthermore, the I-CSCF operates as an access point with another entity within the IMS-based network.

An IP-based session is controlled by a Session Initiation Protocol (SIP) under such an IMS. The SIP is a protocol for controlling a session. The SIP refers to a signaling protocol that specifies a procedure by which terminals to communicate with each other check their locations by identifying them and generate a multimedia service session between them or delete or change the generated session. Such an SI uses an SIP Uniform Resource Identifier (URI) similar to an E-mail address in order to distinguish users from each other so that a service can be provided without being dependent on the address of an Internet Protocol (IP). Such an SIP message is a control message, but is transmitted between UE and the IMS network through an EPC user plane.

Referring to FIG. 6, the first P-GW 53a of the EPC is connected to the P-CSCF 61 of the IMS. The P-CSCF 61 is connected to the IBCF 62. The IBCF 62 is connected to the S-CSCF 63.

Furthermore, the second P-GW 53b of the EPC is connected to the network of an Internet service provider.

FIG. 7 shows an example of setting an Internet Protocol security (IPsec) during an IMS registration process.

The IPsec is a security protocol for secure IP communication. As shown in FIG. 7, whether to use an IPsec protocol may be set for security in the IMS registration process. Details thereof are described below.

1) A UE 10 transmits an SIP REGISTER message transmitted to perform IMS registration. In this case, the UE performs transmission by including its IP Multimedia Private Identity (IMPI) and IP Multimedia Public Identity (IMPU). Further, the UE performs transmission by including information for setting a usage of an IPsec protocol, i.e., security-setups, into the SIP REGISTER message. The use of the IPsec protocol is mandatory for the security. However, the use of encryption is optional whereas the use of integrity is mandatory among several options supported by the IPsec protocol. When the UE intends to use only the integrity, an encryption algorithm field in the security-setup is set to a NULL encryption algorithm.

2) Upon receiving the SIP REGISTER message, a P-CSCF 61 may determine whether to allow the NULL encryption according to an operator's policy. Further, the P-CSCF 61 transmits the SIP REGISTER to an S-CSCF 63.

3-4) The S-CSCF 63 transmits Multimedia Authentication Request to an HSS 54, and receives Multimedia Authentication Answer from the HSS 54.

5) Subsequently, the S-CSCF 63 generates security keys on the basis of Authentication Vector received from the HSS, and transmits to the P-CSCF 61 the security keys inserted into an SIP 401 Unauthorized message.

6) The P-CSCF 61 also delivers the SIP 401 Unauthorized message to the UE on the basis of reception of the SIP 401 Unauthorized message. The P-CSCF 61 sends this message by determining an algorithm to be used in the IPSec.

7-9) Meanwhile, if the IPsec setting is complete, the UE retransmits the SIP REGISTER message to the P-CSCF 61. Herein, the SIP REGISTER message includes Authentication Response based on the IPsec setting. The P-CSCF 61 also transmits the SIP REGISTER message to the S-CSCF 63.

10-11) The S-CSCF 63 delivers an SIP 200 OK message to the UE via the P-CSCF 61.

FIG. 8 shows an example of a roaming mode of voice over LTE (VoLTE).

As described with reference to FIG. 8, a roaming mode of VoLTE includes a home routed (HR) mode and a local breakout (LBO) mode. According to the LBO mode, IMS signalling transmitted from a UE is delivered to an S-CSCF existing in a home PLMN (H-PLMN) via an S-GW/P-GW/P-CSCF existing in a visited public land mobile network (V-PLMN). In the HR mode, it is delivered to the S-CSCF via the S-GW existing in the VPLMN network and via the P-GW/P-CSCF existing in the HPLMN.

On the other hand, intercepting communication of terrorists is further legalized to deter a terror threat of the Islamic State (IS) in recent years. Accordingly, each country requests a telecommunication operator to provide a lawful interception (LI). Accordingly, the telecommunication operator can intercept communication of a specific user when the LI is requested by a national agency. Herein, the interception must be faithfully carried out not only for a subscriber of the telecommunication operator but also for a roaming user from a different telecommunication operator. However, as described above, in case of VoLTE, there are two roaming modes, i.e., the LBO mode and the HR mode.

First, in case of the LBO, even if data is encrypted according to an encryption option of the IPsec protocol, a P-GW and a P-CSCF are managed by one telecommunication operator. Therefore, to satisfy a regulation for the LI, the telecommunication operator decodes the encrypted data or provides an encryption key and algorithm information used for the encryption to a governmental agency.

However, in case of the HR, there is no way for a specific telecommunication operator to decode data of a roaming user from a different telecommunication operator. More specifically, although data must be intercepted by the S-GW to decode the data of the roaming user from the different telecommunication operator, the S-GW cannot perform decoding since the IPsec protocol uses end-to-end encryption between the UE and the P-CSCF.

Accordingly, there is a need to provide a technique capable of legally intercepting communication of terrorists.

SUMMARY OF THE INVENTION

Accordingly, one disclosure of this specification is to propose a scheme capable of solving the aforementioned problems.

In order to achieve the aforementioned purpose, one disclosure of the present invention provides a method in which, when a user equipment (UE) creates a packet data network (PDN) connection for an IP multimedia subsystem (IMS) service, a network node of a communication operator confirms whether roaming is performed on the basis of information of the UE, and if it is confirmed as a roaming UE, informs the UE of whether to use an internet protocol security (IPsec) for a lawful interception (LI).

In more detail, in order to achieve the aforementioned purpose, one disclosure of the present specification provides a method for supporting an internet protocol security (IPsec). The method may be performed by a mobility management entity (MME) and comprise: receiving a tracking area update (TAU) request message from a user equipment (UE); determining whether to activate an encryption option of IPsec; and transmitting a TAU accept message including IPsec related information generated based on the determination.

The determination may be performed based on at least one or more of: a first criteria about whether the UE is roaming; a second criteria about whether a packet data network (PDN) connection established with the UE relates to a IP Multimedia Subsystem (IMS); a third criteria about whether a lawful interception (LI) is requested; and a fourth criteria about whether an option of IPsec needs to be changed.

The IPsec related information may indicate that IPsec is disabled or that a null encryption is to be used.

The IPsec related information further may indicate that an integrity protection option is enabled although the null encryption is used.

The method may further comprise: performing a detach procedure or a disconnection procedure of a PDN established with the UE; receiving an attach request message or a PDN connectivity request message; and transmitting an attach accept message or a PDN connectivity accept message which includes the IPsec related information.

In more detail, in order to achieve the aforementioned purpose, one disclosure of the present specification provides a method of setting an internet protocol security (IPsec). The method may be performed by a user equipment (UE) and comprise: receiving a tracking area update (TAU) accept message including IPsec related information, which is generated based on a determination by a mobility management entity (MME); generating information for setting a usage of IPsec based on the IPsec related information; and transmitting a session initiation protocol (SIP) based register message including the information for setting the usage of IPsec.

The IPsec related information may indicate that IPsec is disabled or that a null encryption is to be used.

The IPsec related information may further indicate that an integrity protection option is enabled although the null encryption is used.

The method may further comprise: performing a detach procedure or a disconnection procedure of a PDN connection; transmitting an attach request message or a PDN connectivity request message; and receiving an attach accept message or a PDN connectivity accept message which includes the IPsec related information.

DESCRIPTION OF EXEMPLARY EMBODIMENTS

Figure 1:
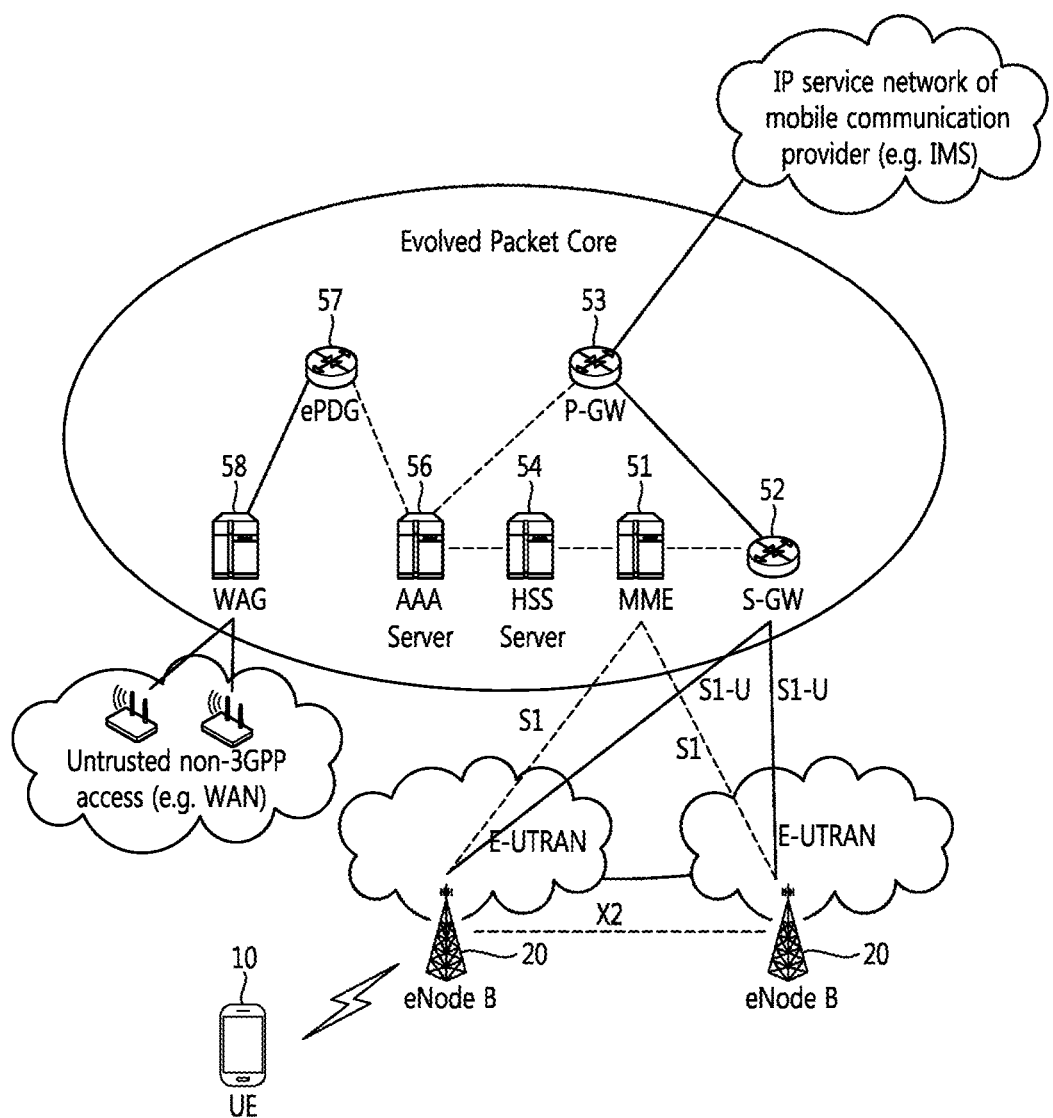
FIG. 1 is a structural diagram of an evolved mobile communication network.
Figure 2:
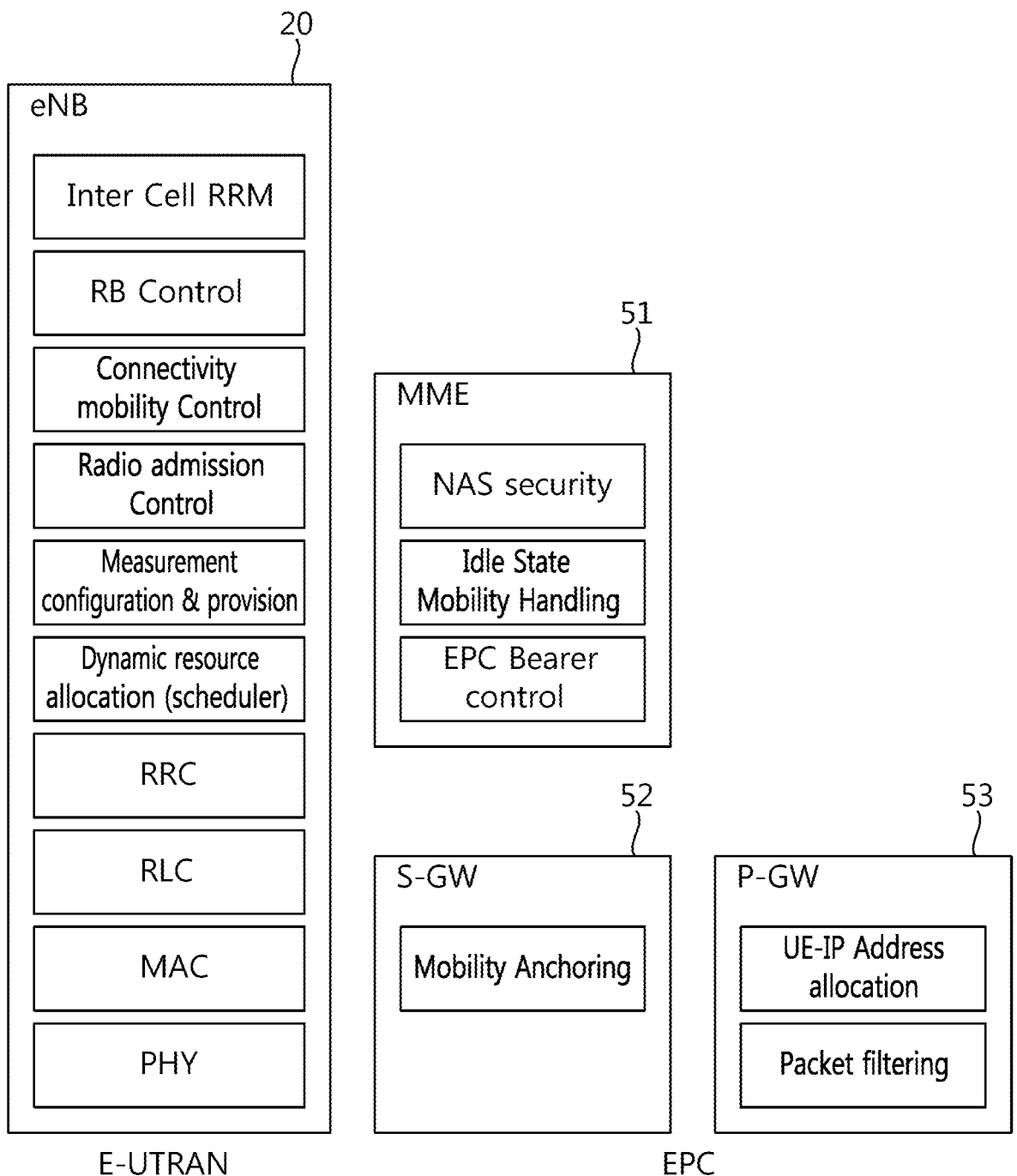
FIG. 2 is an exemplary diagram illustrating architectures of a general E-UTRAN and a general EPC.
Figure 3:
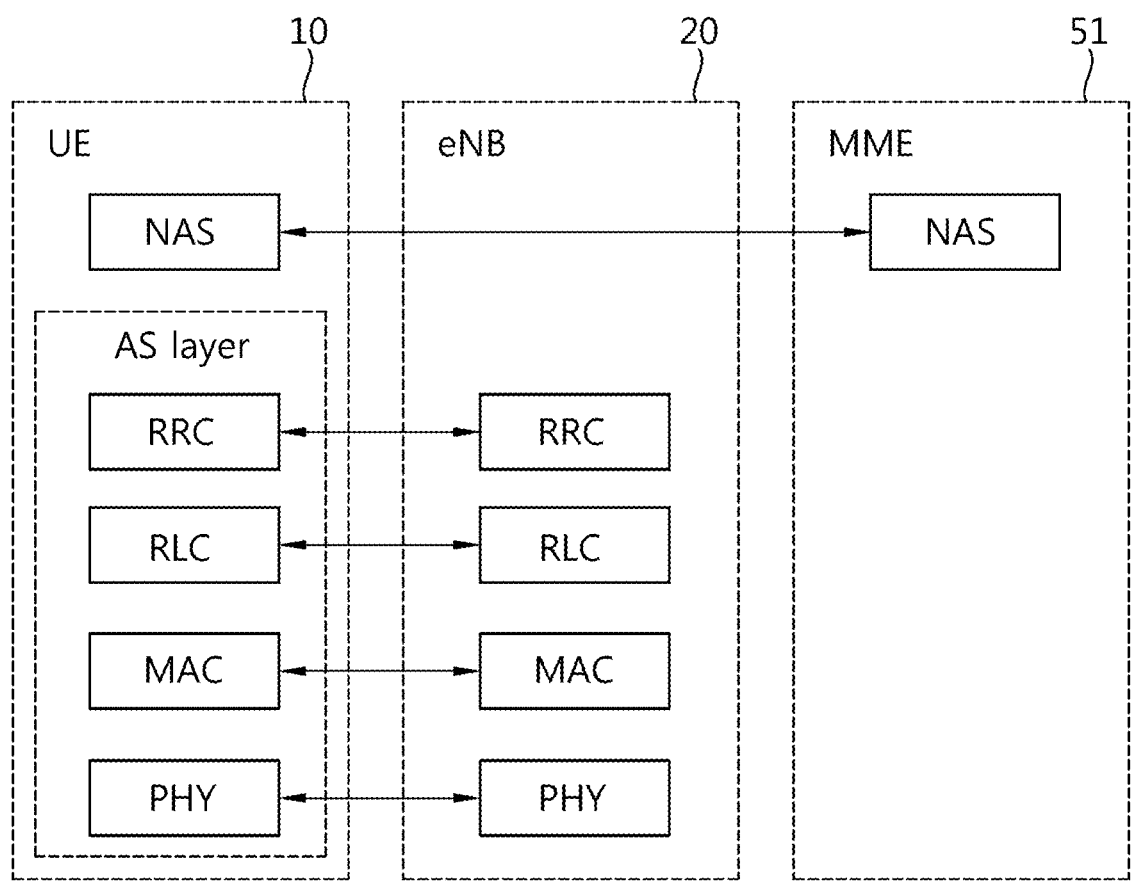
FIG. 3 is an exemplary diagram illustrating a structure of a radio interface protocol on a control plane between UE and eNodeB.
Figure 4:
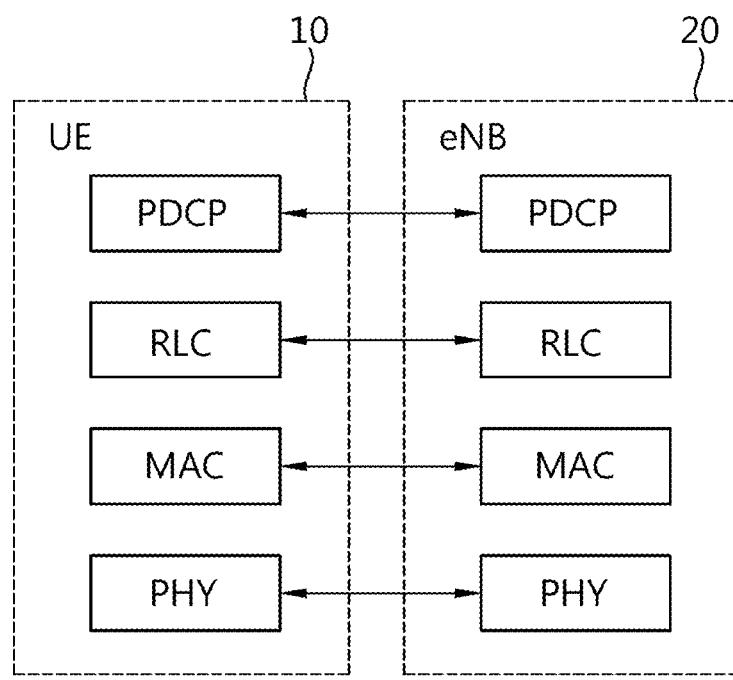
FIG. 4 is another exemplary diagram illustrating a structure of a radio interface protocol on a user plane between the UE and a base station.
Figure 5A:
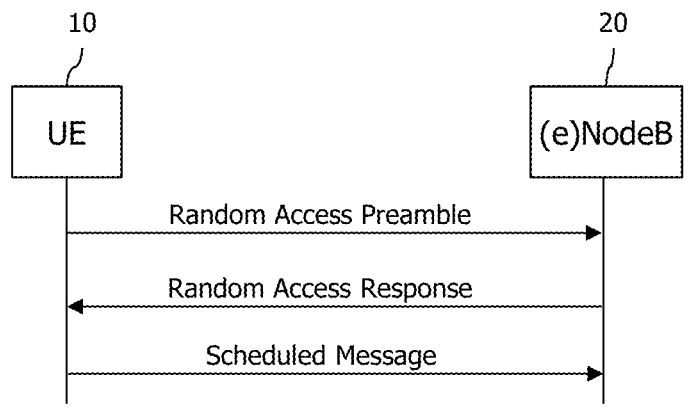
FIG. 5a is a flowchart illustrating a random access process in 3GPP LTE.
Figure 5B:
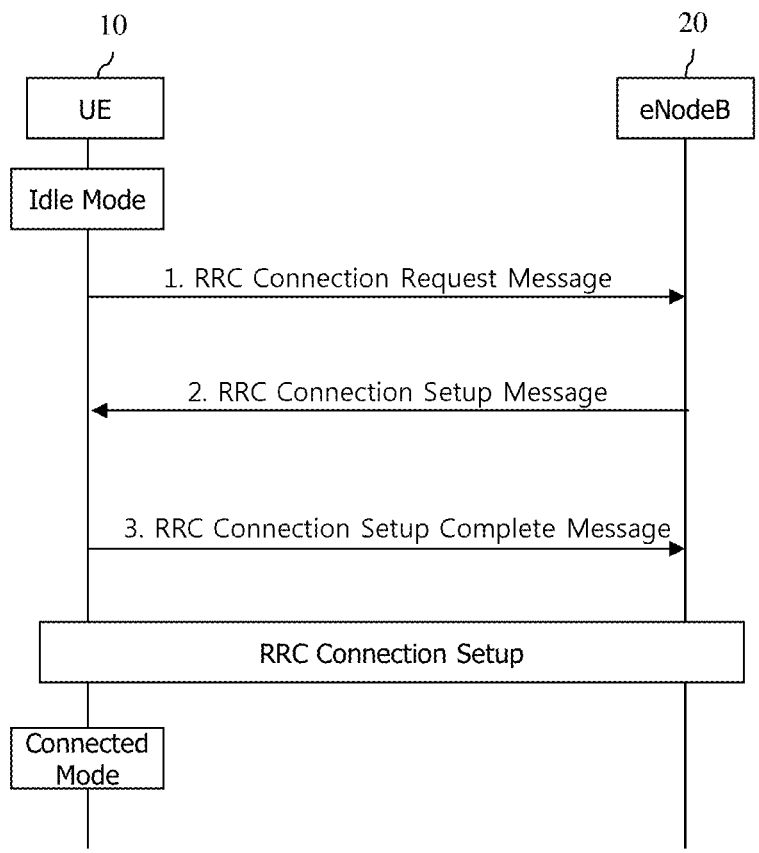
FIG. 5b illustrates a connection process in a radio resource control (RRC) layer.
Figure 6:
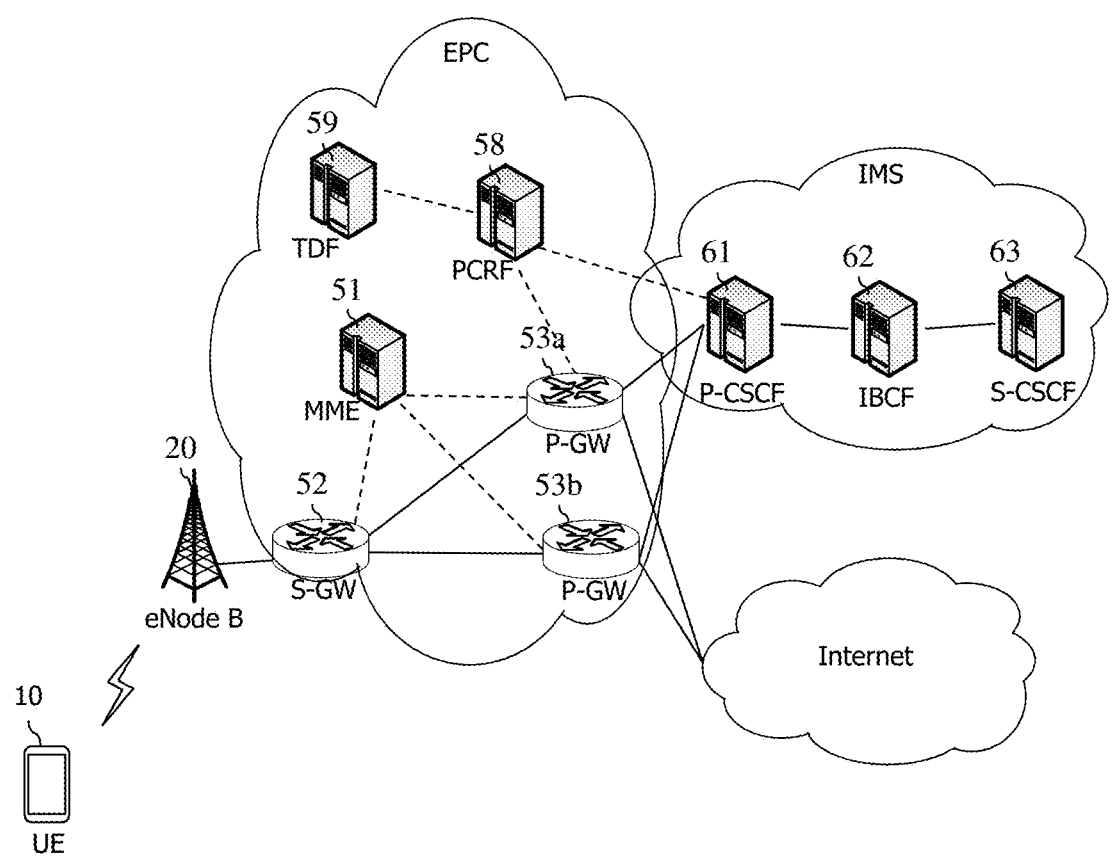
FIG. 6 shows a connection between an EPC and an IP Multimedia Subsystem (IMS).
Figure 7:
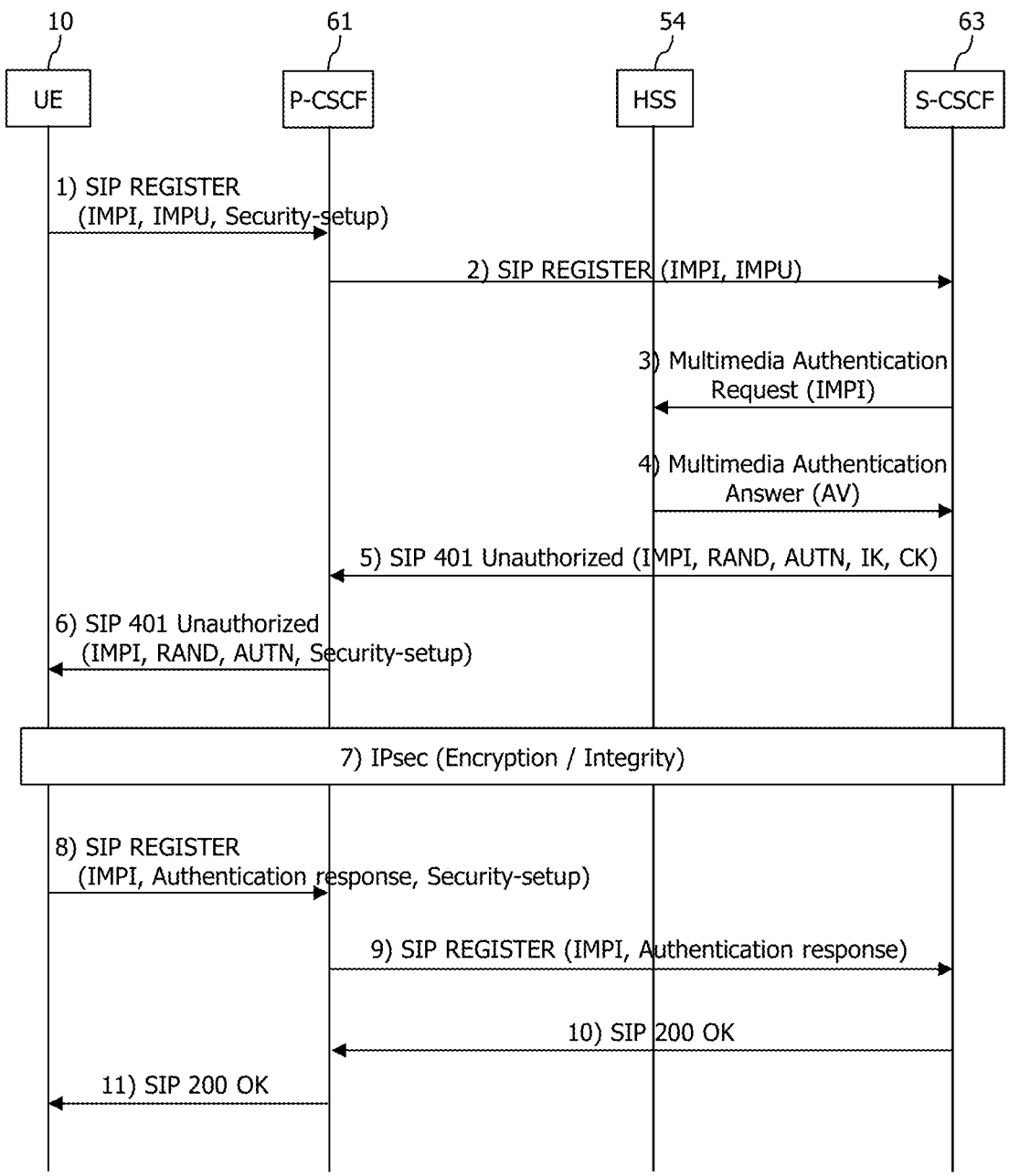
FIG. 7 shows an example of setting an Internet Protocol security (IPsec) during an IMS registration process.
Figure 8:
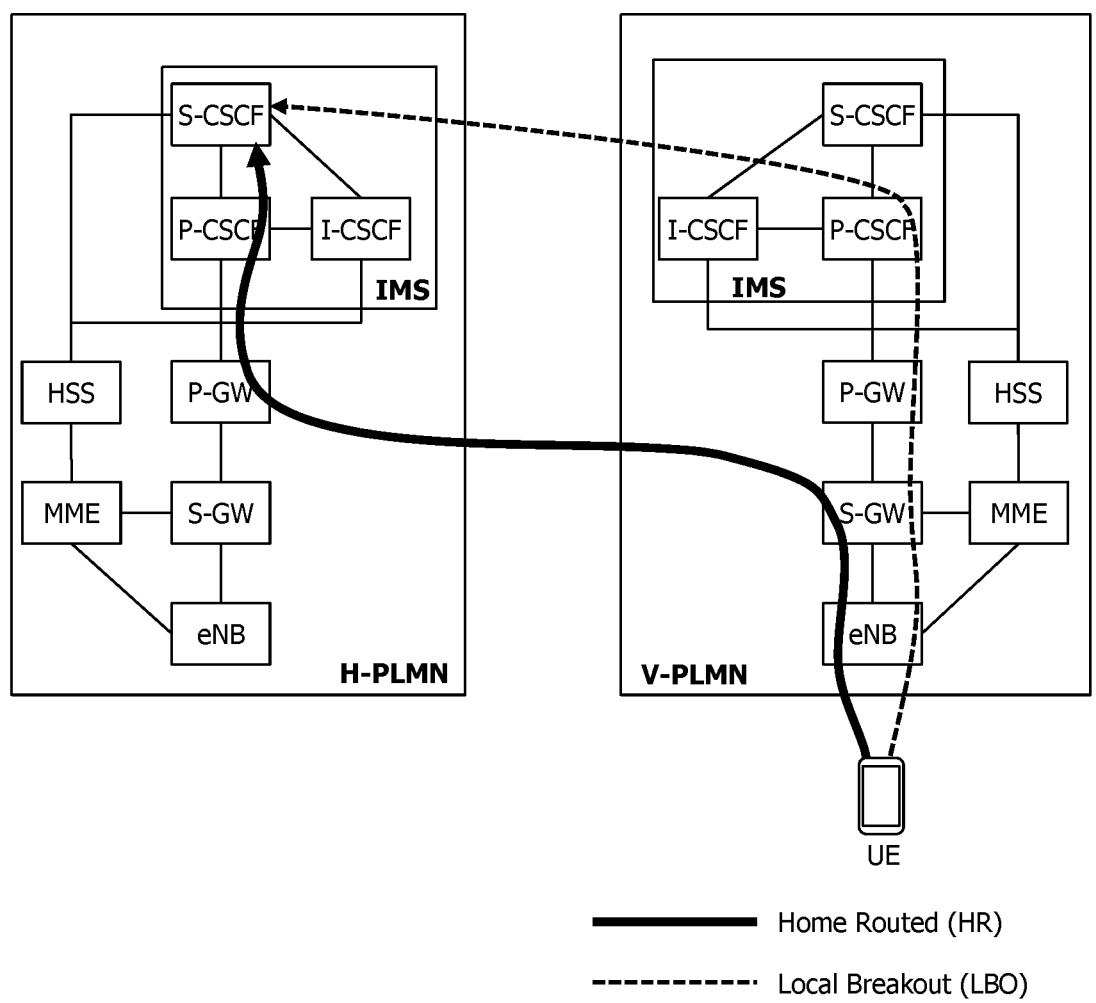
FIG. 8 shows an example of a roaming mode of voice over LTE (VoLTE).

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

DEFINITION OF TERMS

For better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

RAT: an abbreviation of Radio Access Technology. Means GERAN, UTRAN, E-UTRAN, etc.

IPsec (Internet Protocol Security): IPsec is a protocol suite for securing Internet Protocol (IP) communications by authenticating and encrypting each IP packet of a communication session Each of embodiments proposed herein may be implemented solely, but the embodiments may be implemented in combination.

DISCLOSURE OF THE PRESENT INVENTION

The disclosure of the present specification proposes a method in which, when a user equipment (UE) creates a packet data network (PDN) connection for an IP multimedia subsystem (IMS) service, a network node of a communication operator confirms whether roaming is performed on the basis of information of the UE, and if it is confirmed as a roaming UE, informs the UE of whether to use an internet protocol security (IPsec) for a lawful interception (LI). On the basis of information received from the network node, the UE may determine whether the IPsec is not used at all, or only integrity is used among several options of the IPsec protocol, or both of encryption and the integrity are used. On the basis of the determination, security-setup related information is set in an IMS registration process. Details thereof are described below.

Figure 9:
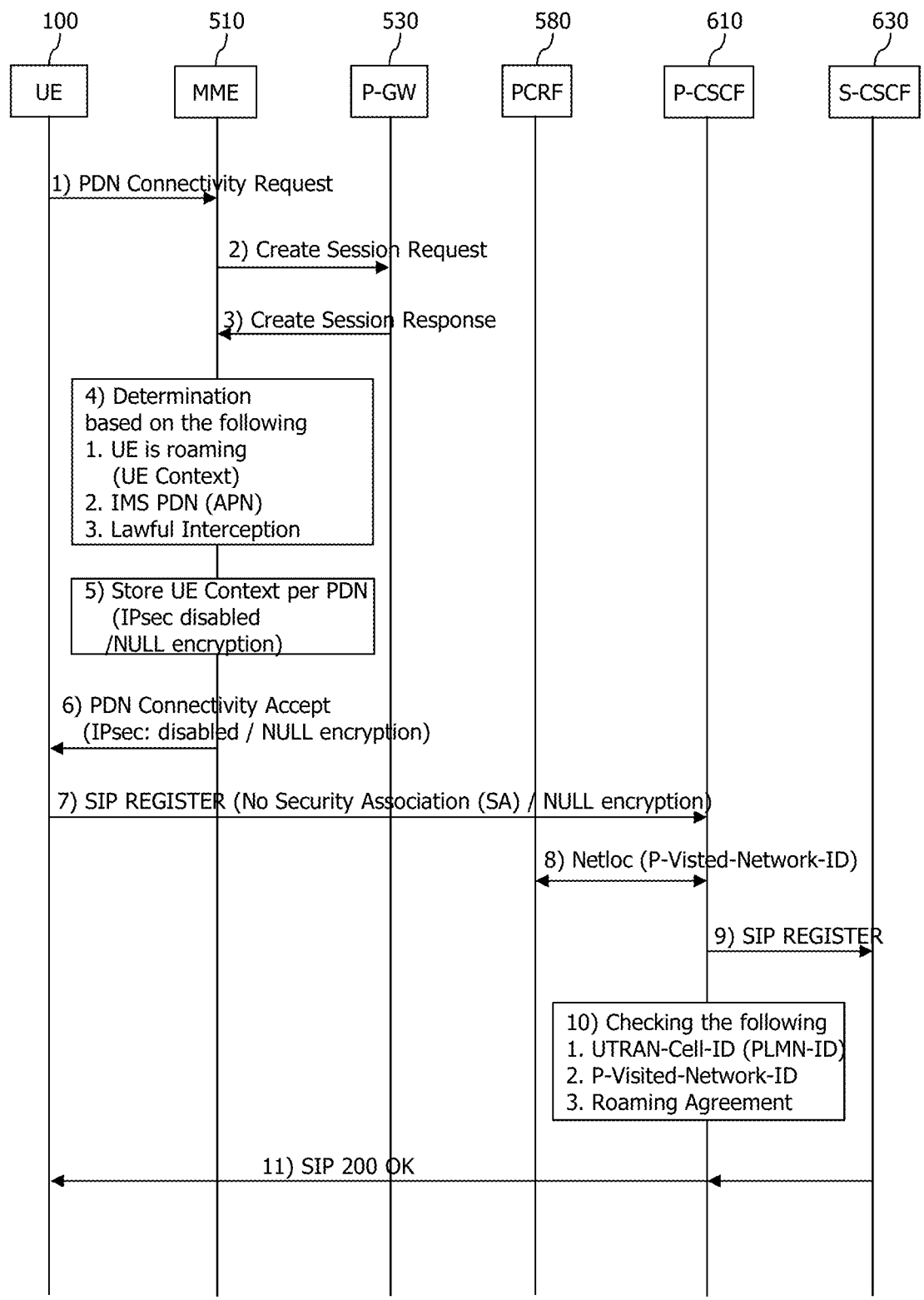
FIG. 9 shows an exemplary solution according to a disclosure of the present specification when a PDN connection procedure is performed.

FIG. 9 shows an exemplary solution according to a disclosure of the present specification when a PDN connection procedure is performed.

Referring to FIG. 9, when a UE requests to create a PDN connection for an IMS service, an MME may determine whether an encryption option of an IPsec protocol is to be deactivated for the UE. Details thereof are described below.

1-3) First, the UE transmits a PDN Connectivity Request message to an MME 510 in order to request the creation of the PDN connection. Then, the MME 510 transmits a Create Session Request message to a P-GW 530, and receives a Create Session Response message from the P-GW 530.

4) Then, the MME 510 determines whether to use the encryption option of the IPsec protocol on the basis of the following criteria information, and according to the determination result, IPsec related information is included in a PDN Connectivity Accept message.

i. Whether the UE is roamed from a different telecommunication operator.

ii. Whether a PDN connection whose creation is requested by the UE is a PDN for IMS.

iii. Whether LI is requested (available in unit of a PLMN or in unit of a user).

When the above three criteria are all satisfied, the MME 510 determines not to use both of the encryption option and the integrity option of the IPsec protocol as to the PDN (determines not to use the IPsec at all), or determines to use only the integrity option and not to use the encryption option. In addition, the MME 510 creates the IPsec related information according to the determination. For example, if it is determined not to use both of the encryption option and the integrity option of the IPsec protocol, the IPsec related information may include IPsec disabled/NULL encryption.

5) The MME 510 stores the IPsec related information created according to the determination into a UE Context per PDN.

6) In addition, the MME 510 transmits the created IPsec related information by including it into the PDN Connectivity Accept message.

7) For the IMS registration, the UE 100 transmits the SIP REGISTER message to the P-CSCF 610. Herein, the SIP REGISTER message includes information for setting a usage of the IPsec protocol. For this, if the IPsec related information is included in the PDN Connectivity Accept message received from the MME 510, the UE 100 creates the information for setting the usage of the IPsec protocol in the SIP REGISTER message. Details thereof are as follows.

First, if it is set in the IPsec related information that the IPsec protocol is not used at all, the UE 100 does not generate a security association (SA) for the IPsec protocol, and thus the SA is not included in the information for setting the usage of the IPsec protocol in the SIP REGISTER message.

Alternatively, if it is set in the IPsec related information that the NULL encryption algorithm is used (that is, if the encryption option is not used and only the integrity option is used), the UE 100 creates an encryption algorithms list, which is to be included in the information for setting the usage of the IPsec protocol, as an empty list.

8-11) If it is set in the SIP REGISTER message received from the UE 100 that the IPsec protocol is not used at all, the P-CSCF 610 performs the following operation.

First, the P-CSCF 610 acquires a PLMN-ID on the basis of a UTRAN-Cell-Id included in the SIP REGISTER message.

Next, the P-CSCF 610 acquires a VPLMN-ID from a PCRF by using Netloc.

In addition, the P-CSCF 610 performs determination on the basis of three pieces of information, i.e., the PLMN-ID, the VPLMN-ID, and a roaming agreement. More specifically, if the PLMN-ID and the VPLMN-ID are identical to each other, the P-CSCF 610 checks a roaming agreement with a corresponding VPLMN. That is, the P-CSCF 610 checks whether the information for setting a usage of the IPsec protocol is properly set in the SIP REGISTER message on the basis of the roaming agreement. If the information for setting the usage of the IPsec protocol in the SIP REGISTER message transmitted by the UE 100 abides by the roaming agreement, the P-CSCF 610 continuously performs the IMS registration process of the UE. Otherwise, the P-CSCF 610 rejects the SIP REGISTER message of the UE.

Figure 10:
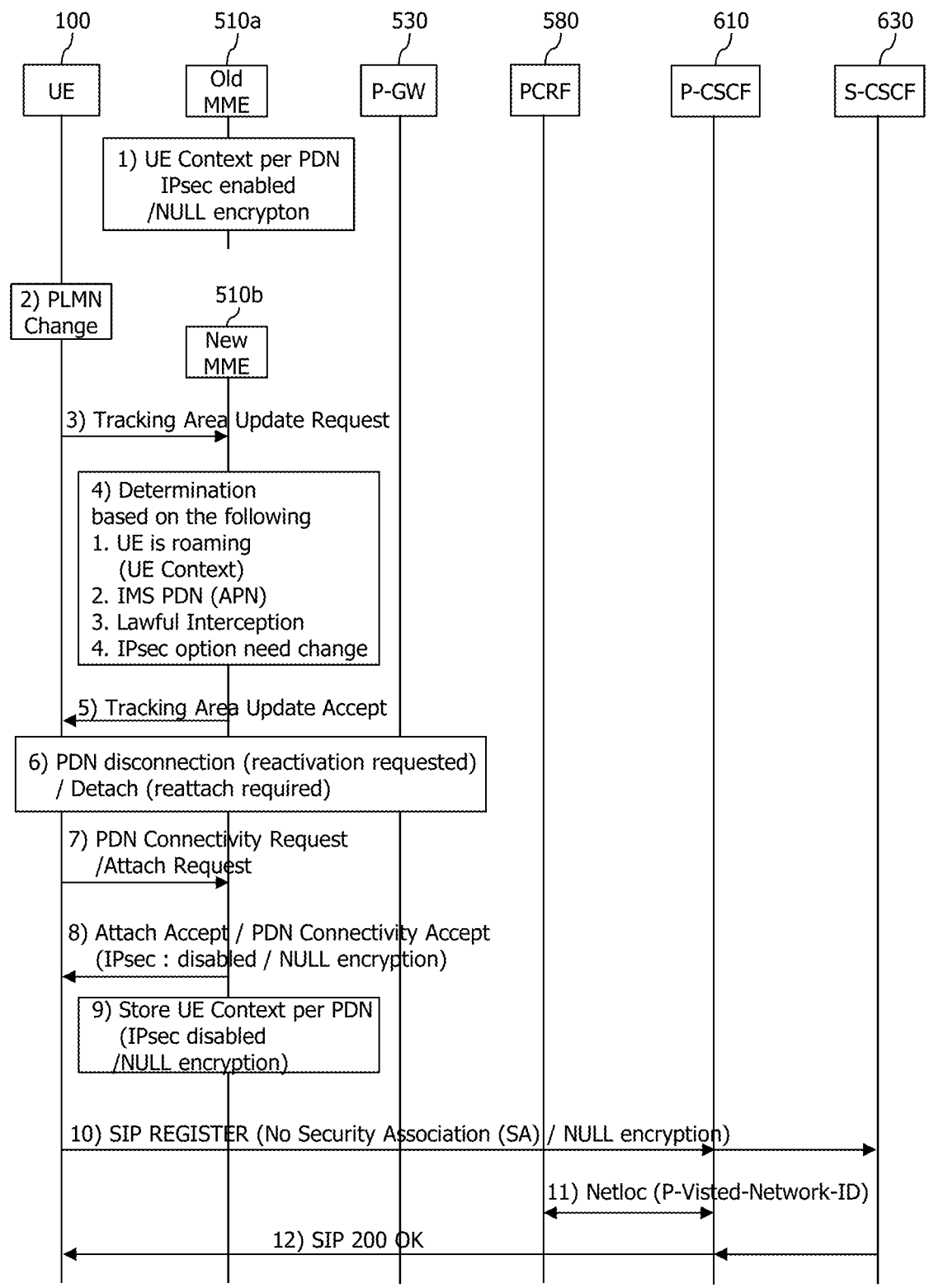
FIG. 10 shows an exemplary solution according to a disclosure of the present specification when a tracking area update (TAU) procedure is performed.

FIG. 10 shows an exemplary solution according to a disclosure of the present specification when a tracking area update (TAU) procedure is performed.

Referring to FIG. 10, if an inter-PLMN handover occurs and thus a TAU procedure is performed, a new MME may update an option of an IPsec protocol to be activated or deactivated. This is to satisfy an LI regulation in a target PLMN according to the inter-PLMN handover. However, if there is no change in MME/S-GW even if the PLMN changes, the aforementioned process is not necessarily performed since the LI is achieved in a previous PLMN. Accordingly, if the UE performs the TAU procedure after the PLMN changes, the new MME updates the option of the IPsec protocol. Details thereof are as follows.

1) First, an old MME 510*a* stores IPsec related information generated according to the steps 1) to 5) of FIG. 9 into UE Context per PDN.

2) The UE 100 performs an inter-PLMN handover, and thus a PLMN is changed.

3) Then, the UE 100 transmits a TAU request message to a new MME 510*b*.

4) If the TAU request message is received, the new MME 510*b* determines whether to use the encryption option of the IPsec protocol on the basis of the following criteria information, and generates IPsec related information according to a result thereof.

i. Whether the UE is roamed from a different telecommunication operator.

ii. Whether a PDN connection whose creation is requested by the UE is a PDN for IMS.

iii. Whether LI is requested (available in unit of a PLMN or in unit of a user).

iv. When an option of the conventional IPsec protocol needs to be changed.

When the above three criteria are all satisfied, the new MME 510*a* determines not to use both of the encryption option and the integrity option of the IPsec protocol as to the PDN (determines not to use the IPsec at all), or determines to use only the integrity option and not to use the encryption option. In addition, the new MME 510*a* generates the IPsec related information according to the determination. For example, if it is determined not to use both the encryption option and the integrity option of the IPsec protocol, the IPsec related information may include IPsec disabled/NULL encryption.

5) The new MME 510*a* transmits to the UE the IPsec related information generated according to the determination by including the information into the TAU Accept message.

6) Thereafter, the new MME 510*a* disconnects the IMS PDN. If the IMS PDN is a last PDN, the new MME 510*a* detaches the UE. The MME 510*a* transmits a message for disconnecting the PDN by setting 'reactivation requested' in a cause field included in the message so that the UE 100 creates the IMS PDN again. However, if the UE is detached, a message for detaching the UE is transmitted by setting 'reattach required' in a cause field included in the message.

7) To re-create the PDN or to be re-attached, the UE 100 transmits a PDN connectivity request message or an attach request message to the new MME 510*a*.

8) Then, the new MME 510*a* sends down the PDN connectivity accept/attach accept message by including IPsec related information.

9) In addition, the new MME 510*a* stores the IPsec related information.

10-12) Thereafter, the UE 100 performs the IMS registration again on the IPsec related information. As to detailed descriptions on the steps 10) to 12) shown herein, the description for the steps 7) to 11) of FIG. 9 are directly applied.

Figure 11:
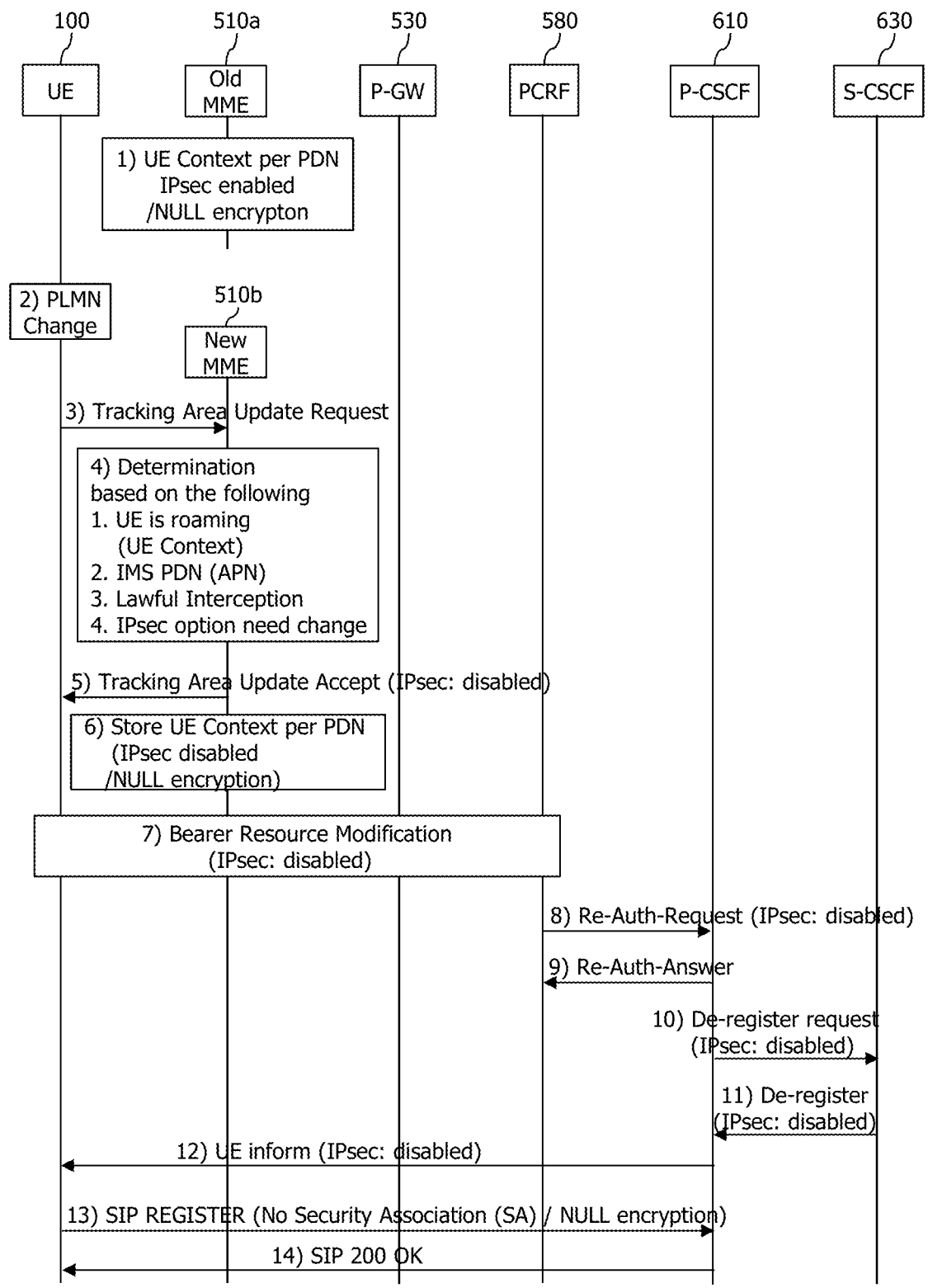
FIG. 11 shows another exemplary solution according to a disclosure of the present specification when a TAU procedure is performed.

FIG. 11 shows another exemplary solution according to a disclosure of the present specification when a TAU procedure is performed.

The solution of FIG. 11 is different from the solution of FIG. 10 in that the new MME 510*a* reports to the UE the change of the option of the IPsec protocol by performing a bearer modification procedure instead of disconnecting the PDN. Accordingly, there is no effect on services other than the IMS. Further, since a PCRF delivers information regarding an option of an IPsec protocol to a P-CSCF, a process of confirming a PLMN-ID of the UE is not necessarily performed in the P-CSCF.

If the P-CSCF is requested from the PCRF to change the IPsec option, the S-CSCF is requested to de-register the UE. After being de-registered from the IMS, the UE performs registration again on the basis of the IPsec option.

Details thereof are as follows.

As to the steps 1) to 5), the description on the steps 1) to 5) of FIG. 10 are directly applied.

6) The new MME 510a stores IPsec related information into UE Context per PDN.

7) A bearer resource modification procedure is performed. In this case, the IPsec protocol is deactivated.

8) The PCRF 580 transmits a Re-Auth-Request message to the P-CSCF 610.

Information indicating that the IPsec is deactivated is included in the Re-Auth-Request message.

9) The P-CSCF 610 transmits a Re-Auth-Answer message to the PCRF 580.

10-12) In addition, the P-CSCF 610 transmits to the S-CSCF 630 a de-register request message including information indicating that the IPsec is deactivated. Upon receiving the de-register message as a response message, the P-CSCF 610 delivers to the UE 100 the information indicating that the IPsec is deactivated.

13)-14) The UE 100 transmits to the P-CSCF 610 an SIP REGISTER message for IMS registration, and receives a 200 OK message. As to detailed description on the steps 13) and 14) shown herein, the description on the steps 7) and 11) of FIG. 9 are directly applied.

Figure 12:
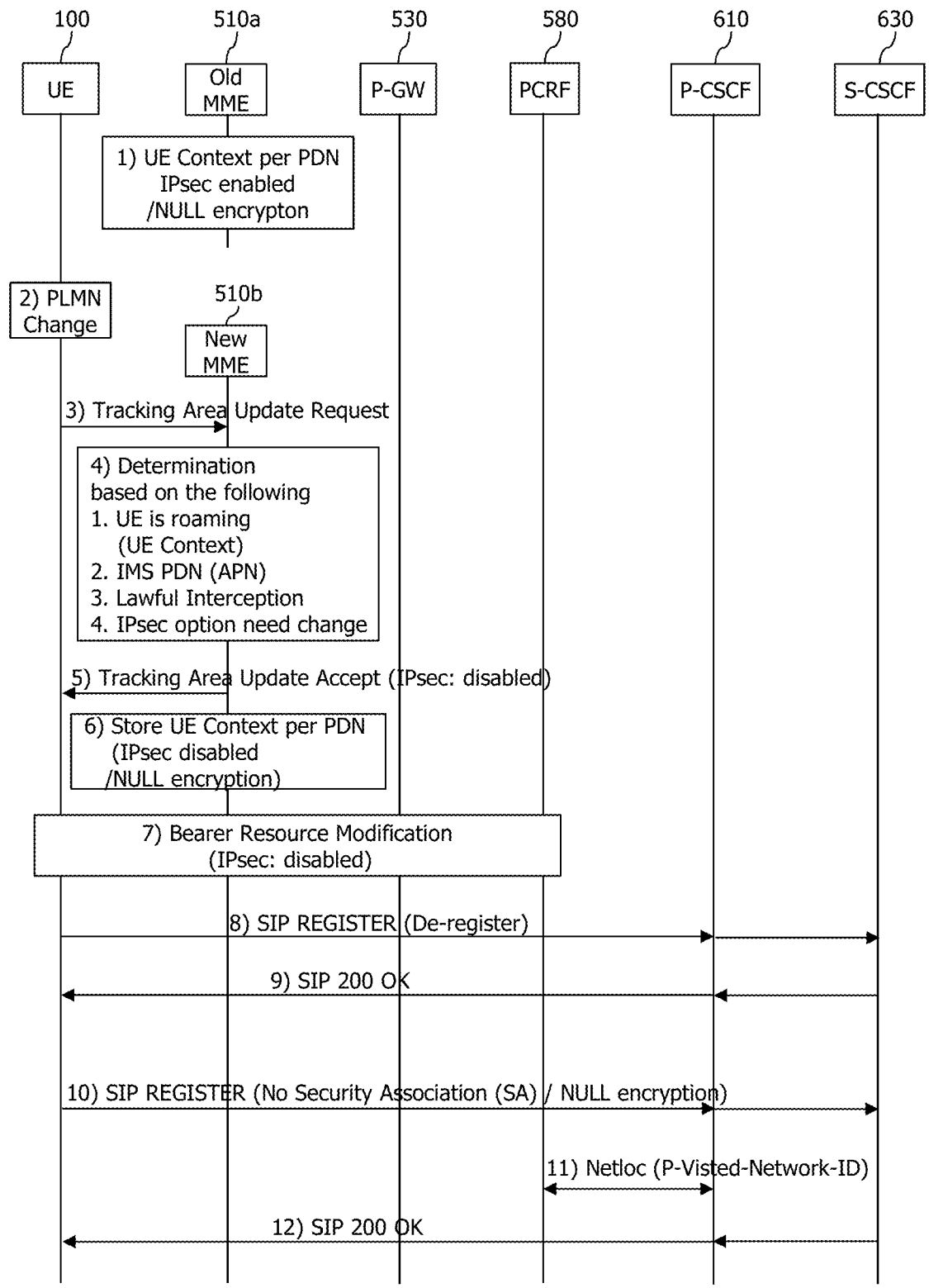
FIG. 12 shows another exemplary solution according to a disclosure of the present specification when a TAU procedure is performed.

FIG. 12 shows another exemplary solution according to a disclosure of the present specification when a TAU procedure is performed.

The solution of FIG. 12 is different from the solution of FIG. 11 in that a UE 100 performs IMS de-registration after a bearer modification procedure is performed. The UE 100 directly performs the de-registration after an option of an IPsec protocol changes, and thereafter performs a registration procedure again according to the option of the IPsec protocol. Since the remaining steps are similar to those of FIG. 11, the descriptions of FIG. 11 will be directly applied.

The content described up to now can be implemented in hardware. This will be described with reference to FIG. 13.

Figure 13:
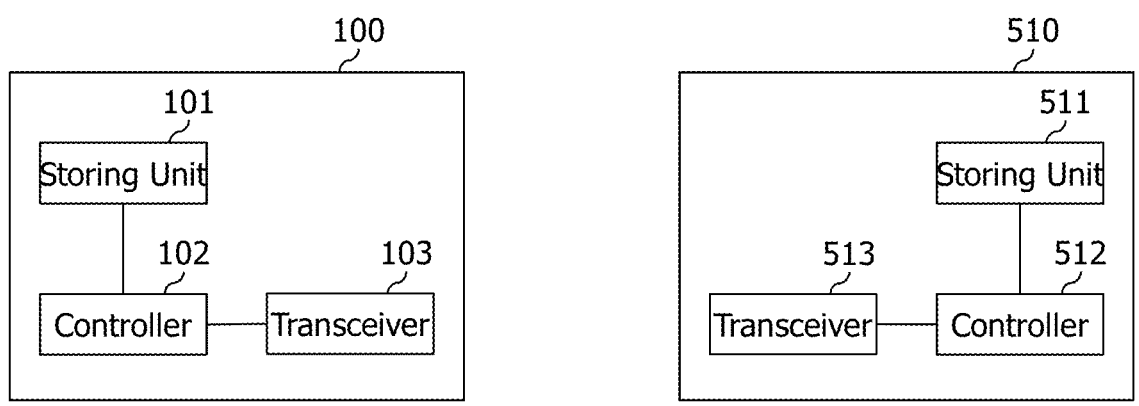
FIG. 13 is a block diagram of a UE 100 and a network node according to an embodiment of the present invention.

FIG. 13 is a block diagram of a UE 100 and a network node according to an embodiment of the present invention.

As shown in FIG. 13, the UE 100 includes a storing unit 101, a controller 102, and a transceiver 103. Further, the network node may be the MME 510. The network node includes a storing unit 511, a controller 512, and a transceiver 513.

The storing units store the aforementioned method.

The controllers control the storing units and the transceivers. More specifically, the controllers respectively execute the methods stored in the storing units. Further, the controllers transmit the aforementioned signals via the transceivers.

According to a disclosure of the present specification, a technical solution capable of performing interception is provided, and if the interception is unnecessary, a method capable of performing encryption is used to solve a security problem of a user.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method for supporting an Internet protocol security (IPsec), the method performed by a mobility management entity (MME) and comprising:
   receiving a tracking area update (TAU) request message from a user equipment (UE);
   determining whether there exists a lawful interception (LI) request for the UE;
   determining whether the UE is roaming by using a home routed (HR) scheme;
   determining to disable an encryption option of IPsec, when the MME determines that the LI request for the UE exists and that the UE is roaming;
   transmitting a TAU accept message including IPsec related information generated based on the determination to disable the encryption option of IPsec; and
   determining whether to perform a detach procedure or to disconnect a packet data network (PDN) connection with the UE based on whether there is a remaining PDN connection;
   transmitting a request message for disconnecting the PDN connection with the UE, based on the determination to disable the encryption option of IPsec, based on the LI request for the UE and based on the determination to disconnect the PDN connection,
   wherein the IPsec related information indicates that an integrity protection option is enabled although a null encryption is used,
   wherein the PDN connection relates to an IP Multimedia Subsystem (IMS), and
   wherein the request message for disconnecting the PDN connection includes a cause field indicating that a reactivation is required.

2. The method of claim 1, wherein the determining whether to disable the encryption option of IPsec is further based on:
   a first criteria about whether the UE is roaming;
   a second criteria about whether the PDN connection established with the UE relates to an IP Multimedia Subsystem (IMS); and
   a third criteria about whether an option of IPsec needs to be changed.

3. The method of claim 1, wherein the IPsec related information indicates that the encryption option of IPsec is disabled or that a null encryption is to be used.

4. The method of claim 1, further comprising:
   performing a detach procedure or a disconnection procedure for PDN connection established with the UE;
   receiving an attach request message or a PDN connectivity request message; and
   transmitting an attach accept message or a PDN connectivity accept message which includes the IPsec related information.

5. A mobility management entity (MME) supporting an internet protocol security (IPsec), the MME comprising:
   a transceiver; and
   a processor, operatively coupled to the transceiver,
   wherein the processor is configured to:
   control the transceiver to receive a tracking area update (TAU) request message from a user equipment (UE);
   determine whether there exists a lawful interception (LI) request for the UE;
   determine whether the UE is roaming by using a home routed (HR) scheme;

determine to disable an encryption option of IPsec, when the processor determines that the LI request for the UE exists and that the UE is roaming;

control the transceiver to transmit a TAU accept message including IPsec related information generated based on the determination to disable the encryption option of IPsec; and determine whether to perform a detach procedure or to disconnect a packet data network (PDN) connection with the UE based on whether there is a remaining PDN connection;

control the transceiver to transmit a request message for disconnecting a packet data network (PDN) connection with the UE, based on the determination to disable the encryption option of IPsec, based on the LI request for the UE and based on the determination to disconnect the PDN connection, wherein the IPsec related information indicates that an integrity protection option is enabled although a null encryption is used, wherein the PDN connection relates to an IP Multimedia Subsystem (IMS), and wherein the request message for disconnecting the PDN connection includes a cause field indicating that a reactivation is required.

6. The MME of claim 5, wherein determining to disable the encryption option of IPsec is based on:

a first criteria about whether the UE is roaming;

a second criteria about whether the PDN connection established with the UE relates to an IP Multimedia Subsystem (IMS); and a third criteria about whether an option of IPsec needs to be changed.

7. The MME of claim 5, wherein the IPsec related information indicates that the encryption option of IPsec is disabled or that a null encryption is to be used.

* * * * *